(12) United States Patent
Kim et al.

(10) Patent No.: US 10,938,024 B2
(45) Date of Patent: Mar. 2, 2021

(54) MANUFACTURING METHOD OF ANODE FOR SECONDARY BATTERY AND ANODE FOR SECONDARY BATTERY MANUFACTURED THEREBY

(71) Applicant: UNIST (ULSAN NATIONAL INSTITUTE OF SCIENCE AND TECHNOLOGY), Ulsan (KR)

(72) Inventors: Youngsik Kim, Ulsan (KR); Young Jin Kim, Ulsan (KR); Da Song Jeong, Ulsan (KR); Jeong Sun Park, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 15/930,361

(22) Filed: May 12, 2020

(65) Prior Publication Data

US 2020/0274145 A1 Aug. 27, 2020

Related U.S. Application Data

(62) Division of application No. 16/150,854, filed on Oct. 3, 2018.

(30) Foreign Application Priority Data

Oct. 11, 2017 (KR) .......................... 10-2017-0131430

(51) Int. Cl.
*H01M 4/1395* (2010.01)
*H01M 10/0525* (2010.01)
(Continued)

(52) U.S. Cl.
CPC ....... *H01M 4/1395* (2013.01); *H01M 4/0478* (2013.01); *H01M 4/13* (2013.01);
(Continued)

(58) Field of Classification Search
CPC combination set(s) only.
See application file for complete search history.

(56) References Cited

U.S. PATENT DOCUMENTS 6,048,639 A * 4/2000 Sonozaki .............. H01M 2/021
429/127
10,714,724 B2 * 7/2020 Roumi ................ H01M 2/1673
(Continued)

FOREIGN PATENT DOCUMENTS

JP 4674789 B2 4/2011
JP 5077315 B2 11/2012
(Continued)

*Primary Examiner* — Kaity V Chandler
(74) *Attorney, Agent, or Firm* — Studebaker & Brackett PC

(57) ABSTRACT

Disclosed herein is an anode for a secondary battery manufactured thereby. The anode for a secondary battery includes a first adhesive member and a second adhesive member to which a plurality of electrolytes are fused, a first case configured to be fused to the first adhesive member, and a second case configured to be fused to the second adhesive member and the first case and into which an anode active material and a liquid electrolyte are injected. The anode has an effect of maximizing a reaction area because an electrolyte is exposed at both surfaces of the anode for a secondary battery.

7 Claims, 7 Drawing Sheets

(51) Int. Cl.
*H01M 10/054* (2010.01)
*H01M 10/0563* (2010.01)
*H01M 10/058* (2010.01)
*H01M 4/38* (2006.01)
*H01M 4/04* (2006.01)
*H01M 4/13* (2010.01)
*H01M 4/139* (2010.01)
*H01M 4/62* (2006.01)
*H01M 4/02* (2006.01)
*H01M 4/134* (2010.01)
*H01M 4/40* (2006.01)

(52) U.S. Cl.
CPC ............ *H01M 4/139* (2013.01); *H01M 4/62* (2013.01); *H01M 10/058* (2013.01); *H01M 10/0525* (2013.01); *H01M 10/0563* (2013.01); *H01M 4/134* (2013.01); *H01M 4/381* (2013.01); *H01M 4/40* (2013.01); *H01M 10/054* (2013.01); *H01M 2004/027* (2013.01)

(56) References Cited

U.S. PATENT DOCUMENTS

| | | | | |
|---|---|---|---|---|
| 2004/0161667 | A1* | 8/2004 | Fukuzawa | H01M 10/0565 429/210 |
| 2004/0253512 | A1* | 12/2004 | Watanabe | H01M 10/0472 429/210 |
| 2005/0132562 | A1* | 6/2005 | Saito | H01M 4/0404 29/623.5 |
| 2008/0118826 | A1* | 5/2008 | Shimamura | H01M 10/052 429/129 |
| 2009/0042095 | A1* | 2/2009 | Inagaki | H01M 10/05 429/92 |
| 2009/0226816 | A1* | 9/2009 | Yoshida | H01M 4/13 429/304 |
| 2010/0291470 | A1* | 11/2010 | Sadasue | H01M 8/1053 429/483 |
| 2015/0086875 | A1* | 3/2015 | Yoshida | H01M 10/0525 429/322 |
| 2015/0093652 | A1* | 4/2015 | Aihara | H01M 10/0525 429/322 |
| 2016/0013463 | A1* | 1/2016 | Roumi | H01M 10/48 429/145 |
| 2016/0149170 | A1* | 5/2016 | Asai | H01M 10/0565 429/186 |
| 2016/0285064 | A1* | 9/2016 | Hatta | B60L 50/64 |
| 2016/0294016 | A1* | 10/2016 | Asai | H01M 10/0567 |
| 2017/0104204 | A1* | 4/2017 | Zhamu | H01M 10/058 |
| 2017/0110760 | A1* | 4/2017 | Hatta | H01M 4/623 |
| 2018/0166683 | A1* | 6/2018 | Yamauchi | H01M 4/131 |
| 2018/0254474 | A1* | 9/2018 | Izumi | H01M 10/0525 |
| 2019/0006700 | A1* | 1/2019 | Makino | H01M 10/056 |

FOREIGN PATENT DOCUMENTS

| | | |
|---|---|---|
| KR | 10-2008-0052557 A | 6/2008 |
| KR | 10-1023919 B1 | 3/2011 |
| KR | 10-2011-0041870 A | 4/2011 |
| KR | 10-2012-0064171 A | 6/2012 |
| KR | 10-2017-0026428 A | 3/2017 |

\* cited by examiner

MANUFACTURING METHOD OF ANODE FOR SECONDARY BATTERY AND ANODE FOR SECONDARY BATTERY MANUFACTURED THEREBY

CROSS-REFERENCE TO RELATED APPLICATION

This application is a divisional application of U.S. patent application Ser. No. 16/150,854 filed on Oct. 3, 2018, which claims priority of Korean Patent Application No. 10-2017-0131430, filed on Oct. 11, 2017, in the Korean Intellectual Property Office. The above-listed applications are incorporated herein by reference in their entirety.

BACKGROUND

1. Field of the Invention

The present invention relates to a manufacturing method of an anode for a secondary battery, which is capable of realizing a secondary battery in which an electrolyte is exposed to both sides of an anode and thus a contact area between a liquid electrolyte and an electrolyte is increased to have an improved volume output density, and an anode for a secondary battery manufactured thereby.

2. Discussion of Related Art

Generally, a secondary battery refers to a battery in which charging and discharging occur through conversion between chemical energy and electrical energy using an electrochemically reactable material at a cathode and an anode. The secondary battery is mainly used where electric power storage of a large capacity is required such as a vehicle or a vessel.

A typical example of the secondary battery is a lithium ion battery which generates electrical energy as a result of a change in chemical potential when metal ions (e.g., lithium, sodium, or the like) are intercalated or deintercalated at a cathode and an anode (Patent Document 1).

However, there are problems in that the lithium ion battery has a high risk of explosion, high costs are required to implement a large-scale energy storage system (ESS) since the price of a lithium metal oxide (e.g., $LiCoO_2$, $LiMn_2O_4$, and the like) used as a cathode active material is high, and environmental problems may be caused in disposal of spent batteries.

Therefore, there is a need to select a material that is low in risk of explosion, is environmentally friendly, abundant in the earth, and low in price, but the results of this research are still insufficient.

PRIOR ART DOCUMENT

Patent Document (Patent Document 1) Korean Patent Registration No. 10-1023919

SUMMARY OF THE INVENTION

The present invention is directed to a manufacturing method of an anode for a secondary battery, which is capable of realizing a secondary battery in which an electrolyte is exposed to both sides of an anode and thus a contact area between a liquid electrolyte and an electrolyte is increased to have an improved volume output density, and an anode for a secondary battery manufactured thereby.

Further, the present invention is directed to a manufacturing method of an anode for a secondary battery, which is manufactured through a relatively simplified process.

The objects of the present invention are not limited to the above-described objects, and other unmentioned objects will be clearly understood from the following description.

According to an aspect of the present invention, there is provided a manufacturing method of an anode for a secondary battery, which includes firstly fusing a plurality of electrolytes to a first adhesive member and a second adhesive member, secondly fusing the first adhesive member and the second adhesive member to a first case and a second case, respectively, injecting an anode active material and a liquid electrolyte into the second case to which the second adhesive member is fused, and thirdly fusing the first case and the second case to each other.

The manufacturing method may further include, before the first fusing, forming a plurality of openings by punching the first adhesive member and the second adhesive member.

The forming of the plurality of openings may include forming the plurality of openings at the first adhesive member and the second adhesive member corresponding to a plurality of openings formed at the first case and the second case, respectively.

The first fusing may include fusing edges of the plurality of electrolytes to edges of the plurality of openings formed at the first adhesive member and the second adhesive member.

The second fusing may include seating the plurality of electrolytes on stepped levels, which are formed along edges of the plurality of openings formed at each of the first case and the second case, and then fusing the first adhesive member and the second adhesive member at the first case and the second case, respectively.

The third fusing may include thermally fusing protrusions formed at edges of the first case and the second case.

The injecting and the third fusing may be performed in an argon (Ar) atmosphere.

According to another aspect of the present invention, there is provided an anode for a second battery, which includes a first adhesive member and a second adhesive member to which a plurality of electrolytes are fused, a first case configured to be fused to the first adhesive member, and a second case configured to be fused to the second adhesive member and the first case and into which an anode active material and a liquid electrolyte are injected.

The anode for a second battery may further include an anode current collector provided inside the second case and having a portion exposed to the outside of the second case to form an external connection terminal.

The first adhesive member and the second adhesive member may have sheet shapes.

Each of the first adhesive member and the second adhesive member may include a plurality of openings having edges fused to the plurality of electrolytes.

Each of the first case and the second case may include a plurality of openings configured to expose portions of the plurality of electrolytes to the outside of the anode for a secondary battery.

The plurality of openings may be disposed to face each other at the first case and the second case.

Each of the first case and the second case may include stepped levels on which the plurality of electrolytes are seated and which are formed along edges of the plurality of openings.

Details for achieving the above-described objectives of the present invention will be more apparent from the following detailed embodiments taken in conjunction with the accompanying drawings.

However, it should be understood that the present invention is not limited to the following disclosed embodiments but may be embodied in many different forms and this disclosure of the present invention is provided to be thorough and fully convey the scope of the present invention to a person skilled in the art to which the present invention pertains (hereinafter, referred to as an "ordinary person").

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
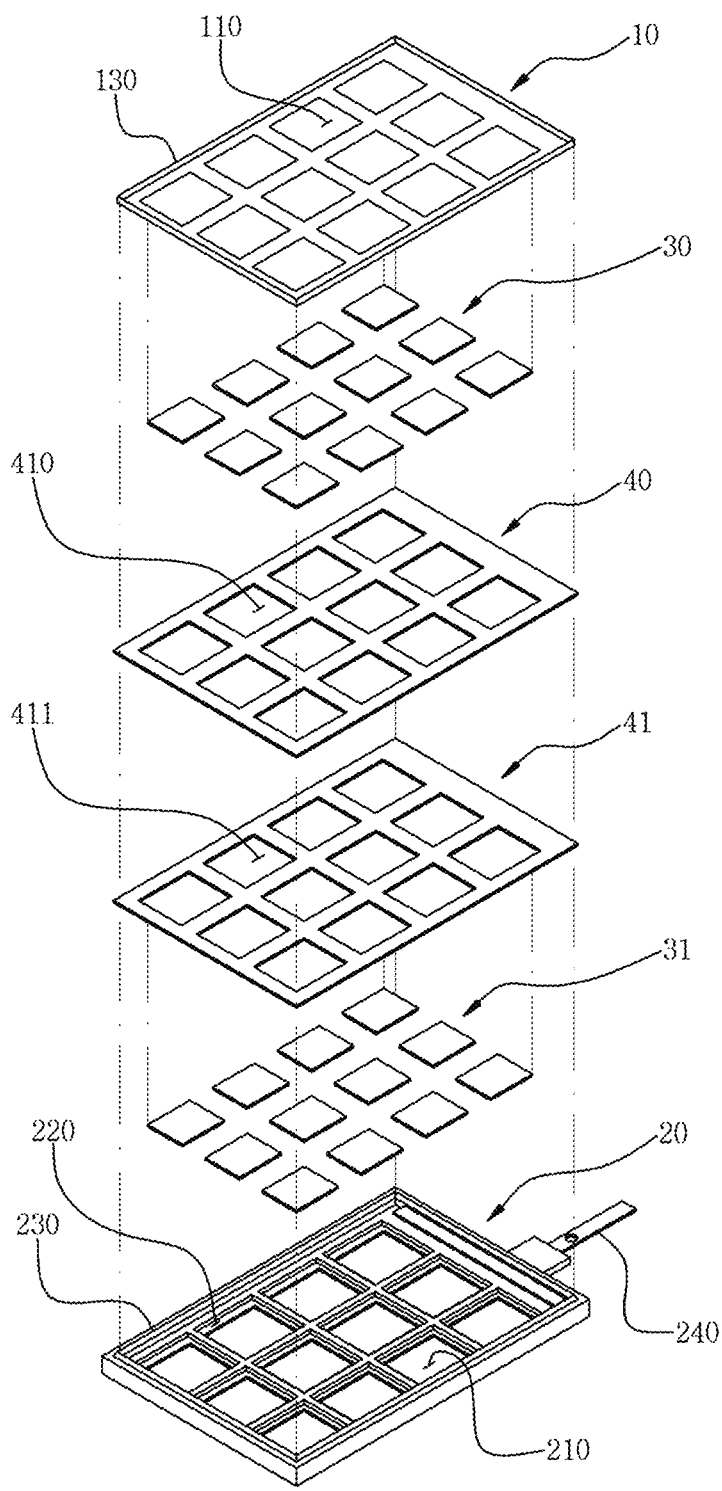
FIG. 1 is an exploded perspective view of an anode for a secondary battery according to one embodiment of the present invention.

The present invention may be modified into various forms and may have a variety of embodiments, and, therefore, specific embodiments will be illustrated in the drawings and described in detail.

Various features of the present invention disclosed in the appended claims may be better understood in consideration of the drawings and the detailed description thereof. Apparatuses, methods, manufacturing processes, and various embodiments disclosed in this disclosure are provided for illustrative purposes. The disclosed structural and functional features are intended to allow those skilled in the art to particularly embody various embodiments and are not intended to limit the scope of the invention. The terms and phrases disclosed herein are intended to facilitate understanding of the various features of the disclosed invention and are not intended to limit the scope of the invention.

In the following description of the present invention, if a detailed description of a known related art is determined to obscure the gist of the present invention, the detailed description thereof will be omitted.

Hereinafter, a manufacturing method of an anode for a secondary battery and an anode for a secondary battery manufactured thereby according to the present invention will be described with reference to the accompanying drawings.

A secondary battery referred to in this present disclosure may mean a secondary battery including an ion-containing solution as a cathode electrolyte solution. Non-limiting examples of ion containing solutions include sodium, lithium, magnesium, and seawater containing a combination thereof.

Figure 2A:
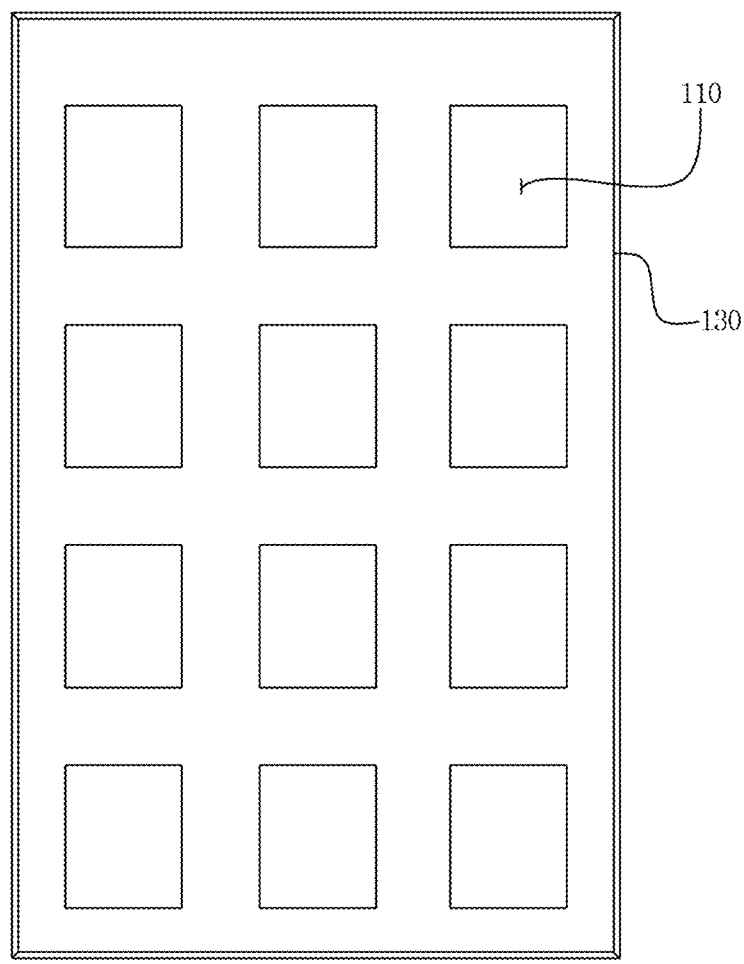
FIG. 2A is a diagram illustrating an outer surface of a first case of the anode for a secondary battery according to one embodiment of the present invention.
Figure 2B:
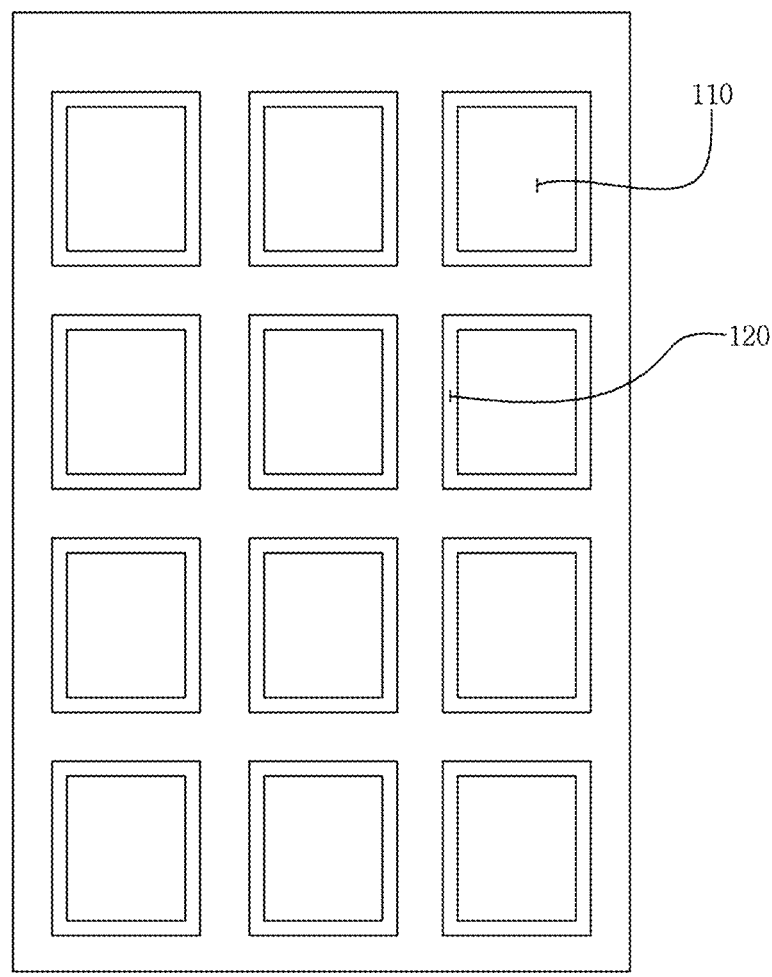
FIG. 2B is a diagram illustrating an inner surface of the first case of the anode for a secondary battery according to one embodiment of the present invention.
Figure 3:
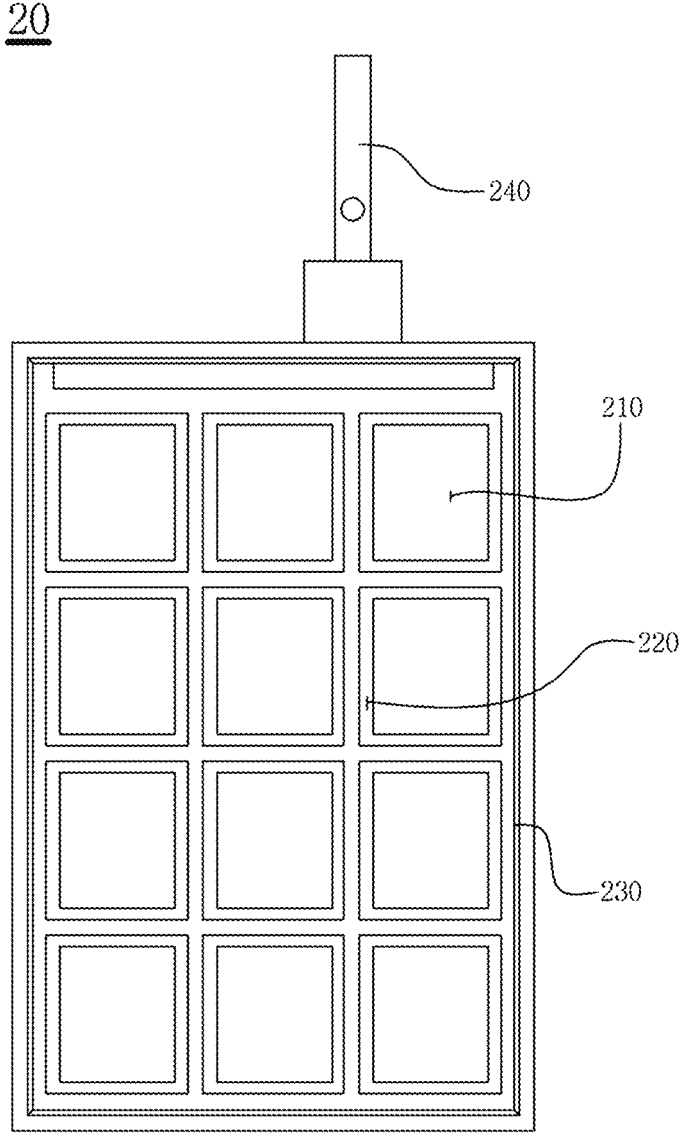
FIG. 3 is a diagram illustrating a second case of the anode for a secondary battery according to one embodiment of the present invention.
Figure 4:
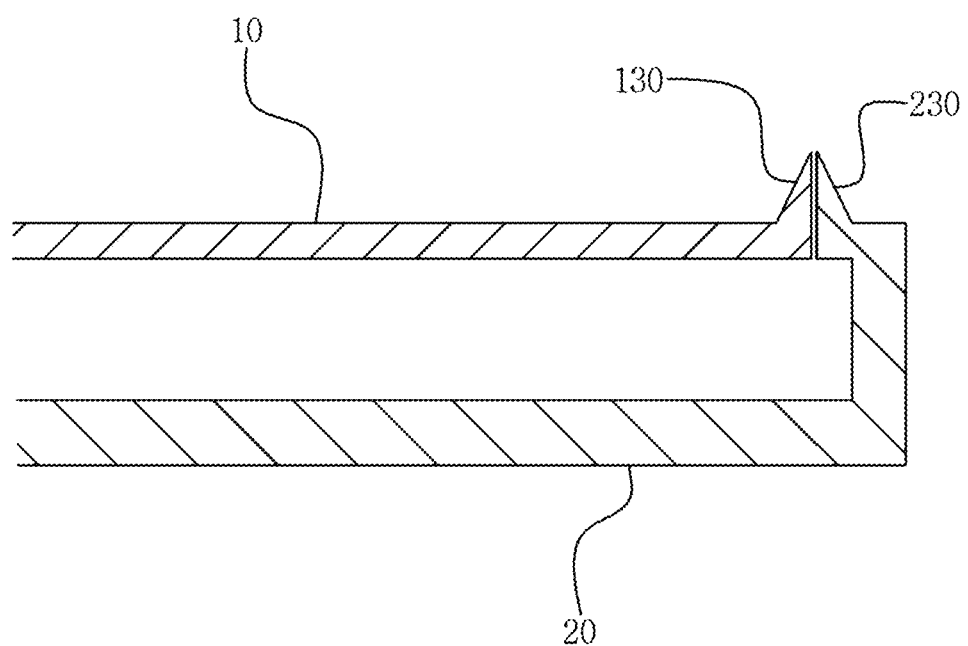
FIG. 4 is a cross-sectional view of the first case and the second case of the anode for a secondary battery according to one embodiment of the present invention.

FIG. 1 is an exploded perspective view of an anode for a secondary battery according to one embodiment of the present invention, FIG. 2A is a diagram illustrating an outer surface of a first case of the anode for a secondary battery according to one embodiment of the present invention, FIG. 2B is a diagram illustrating an inner surface of the first case of the anode for a secondary battery according to one embodiment of the present invention, FIG. 3 is a diagram illustrating a second case of the anode for a secondary battery according to one embodiment of the present invention, and FIG. 4 is a cross-sectional view of the first case and the second case of the anode for a secondary battery according to one embodiment of the present invention.

Referring to FIGS. 1 to 4, an anode 1 for a secondary battery according to the present embodiment may include a first case 10, a second case 20, electrolytes 30 and 31, a first adhesive member 40, a second adhesive member 41, and an anode current collector 240.

Materials of the cases 10 and 20 are not specified, and materials suitable for a purpose of use and an environment may be selected.

Meanwhile, polypropylene (PP) is a very stable material against a liquid electrolyte which is injected into the anode 1 for a secondary battery. Further, PP is a very stable material against an ion-containing solution outside the anode 1 for a secondary battery.

Therefore, PP may be preferably selected as a material of the first and second cases 10 and 20.

Further, PP has a property of easily melting by heat. Therefore, when PP is selected as the material of the first and second cases 10 and 20, there is an advantage in that heat fusing may be easily applied to a manufacturing process of the anode 1 for a secondary battery according to the present embodiment.

The first and second cases 10 and 20 may include a plurality of openings 110 and 210.

The number and arrangement of the plurality of openings 110 and 210 are not specified and may be varied according to a purpose of use and an environment.

The plurality of openings 110 included in the first case 10 and the plurality of openings 210 included in the second case 20 may correspond to each other.

For example, the plurality of openings 110 included in the first case 10 and the plurality of openings 210 included in the second case 20 may be formed at positions opposite to each other. That is, the plurality of openings 110 included in the first case 10 and the plurality of openings 210 included in the second case 20 may be formed to face each other. Further, the plurality of openings 110 included in the first case 10 and the plurality of openings 210 included in the second case 20 may be the same in size and shape.

The electrolytes 30 and 31 are exposed to the outside by the plurality of openings 110 and 210 to be brought into direct contact with an ion-containing solution.

Meanwhile, since both the first case 10 and the second case 20 include the plurality of openings 110 and 210, the electrolytes 30 and 31 are exposed to the outside from both upper and lower surfaces of the anode 1 for a secondary battery.

That is, the electrolytes 30 and 31 may be brought into direct contact with the ion-containing solution on both the upper and lower surfaces of the anode 1 for a secondary battery. That is, the anode 1 for a secondary battery according to the present embodiment has a wide reaction area, and thus it is possible to implement a secondary battery having an improved volume output density.

The anode current collector 240 may be provided in the second case 20. For example, the anode current collector 240 may be provided at one inner side surface of the second case 20.

A material constituting the anode current collector 240 is not particularly limited as long as it has conductivity while not causing a chemical change.

Meanwhile, a portion of the anode current collector 240 may be exposed to the outside of the second case 20. The portion of the anode current collector 240 exposed to the outside of the second case 20 may form an external connection terminal. The anode 1 for a secondary battery may be electrically connected to the outside such as a cathode portion via the external connection terminal.

Meanwhile, there is a problem in that a single large electrolyte has durability lower than that of a plurality of small electrolytes.

In order to solve such a problem, the anode 1 for a secondary battery according to the present embodiment may include a plurality of small electrolytes 30 and 31 instead of a single large electrolyte. Therefore, the anode 1 for a secondary battery according to the present embodiment may have a very high durability.

The electrolytes 30 and 31 may be respectively seated inside the first and second cases 10 and 20. Meanwhile, stepped levels 120 and 220 may be formed along edges of the plurality of openings 110 and 210. Preferably, the electrolytes 30 and 31 are seated on the stepped levels 120 and 220, and thus the electrolytes 30 and 31 may be seated inside the first and second cases 10 and 20.

Sizes of the electrolytes 30 and 31 are preferably larger than sizes of the plurality of openings 110 and 210. This is to prevent the electrolytes 30 and 31 from separating from the anode 1 for a secondary battery.

A material of the electrolytes 30 and 31 is not particularly limited as long as it is capable of selectively transmitting metal ions (e.g., $Li^+$ or $Na^+$).

Preferably, the material of the electrolytes 30 and 31 may be a stable material against an ion-containing solution and a liquid electrolyte. Further, the material of the electrolytes 30 and 31 may be a material having a high permeation rate of metal ions.

For example, the material of the electrolytes 30 and 31 may be at least one from among a Na superionic conductor (NASICON), a Li superionic conductor (LISICON), an amorphous ion conductive material, a ceramic ion conductive material, and a polymer-based material.

Preferably, the material of the electrolytes 30 and 31 may be NASICON.

The first and second adhesive members 40 and 41 may be fused to the electrolytes 30 and 31 and the first and second cases 10 and 20.

The first and second adhesive members 40 and 41 may fix the electrolytes 30 and 31 to the first and second cases 10 and 20. Further, the first and second adhesive members 40 and 41 may prevent water, gas, and the like from flowing into the anode 1 for a secondary battery according to the present embodiment. Furthermore, the first and second adhesive members 40 and 41 may prevent leaks of an anode active material, a liquid electrolyte, and the like in the anode 1 for a secondary battery according to the present embodiment.

A material of the first and second adhesive members 40 and 41 is not particularly limited as long as it is a stable material against an ion-containing solution and a liquid electrolyte. For example, the material of the first and second adhesive members 40 and 41 may be a laminator into which aluminum is inserted.

A shape of each of the first and second adhesive members 40 and 41 may be in the form of a sheet which is cut according to an inner size of each of the first and second cases 10 and 20.

The first and second adhesive members 40 and 41 may include a plurality of openings 410 and 411.

The plurality of openings 410 and 411 may be formed to face each other at positions opposite to the plurality of openings 110 and 210 included in the first and second cases 10 and 20.

Sizes of the openings 410 and 411 are preferably smaller than the sizes of the electrolytes 30 and 31. This is to allow the electrolytes 30 and 31 and the first and second adhesive members 40 and 41 to be easily fused.

The electrolytes 30 and 31 may be fused to the first and second adhesive members 40 and 41.

Preferably, edges of the electrolytes 30 and 31 and edges of the plurality of openings 410 and 411 included in the first and second adhesive members 40 and 41 may be fused.

Further, the first and second adhesive members 40 and 41 may be fused to the first and second cases 10 and 20. That is, the first adhesive member 40 may be fused to the first case 10, and the second adhesive member 41 may be fused to the second case 20.

The first and second adhesive members 40 and 41 may be fused to the first and second cases 10 and 20 after the electrolytes 30 and 31 are seated inside the first and second cases 10 and 20. That is, the electrolytes 30 and 31 may be fixed inside the first and second cases 10 and 20 by the first and second adhesive members 40 and 41.

An anode active material and a liquid electrolyte may be injected into the second case 20 to which the second adhesive member 41 is fused.

The anode active material may be at least one of a sodium metal and a sodium intercalation material.

The liquid electrolyte is not particularly limited as long as it is a substance capable of acting as a medium through which ions involving in an electrochemical reaction of a battery may move.

For example, the liquid electrolyte may be an organic electrolyte solution capable of acting as a medium through which sodium ions may move.

Meanwhile, referring to FIG. 4, protrusions 130 and 230 may be formed along edges of the first and second cases 10 and 20. The protrusions 130 and 230 may have sizes and shapes to allow the first and second cases 10 and 20 to be easily fused to each other.

Meanwhile, the anode 1 for a secondary battery according to the present embodiment may further include a fabric layer (not shown). The fabric layer may be wetted with a liquid electrolyte.

In a practical usage process, there may occur a situation in which liquid electrolytes in the first and second cases 10 and 20 are difficult to be brought into contact with the electrolytes 10 and 20 as a result of which the anode 1 for a secondary battery is inclined due to an external environment and the like.

However, when the fabric layer is included, even though such a situation occurs, the liquid electrolyte wetting into the fabric layer may be brought into contact with the electrolytes 10 and 20, so that the anode 1 for a secondary battery according to the present embodiment may be operated more stably.

Preferably, the fabric layer may be provided inside the first and second cases 10 and 20.

Hereinafter, a manufacturing method of an anode for a secondary battery according to another embodiment of the present invention will be described with reference to FIGS. 5 and 6. In the following description, descriptions overlapping with those described above will be omitted.

Figure 5:
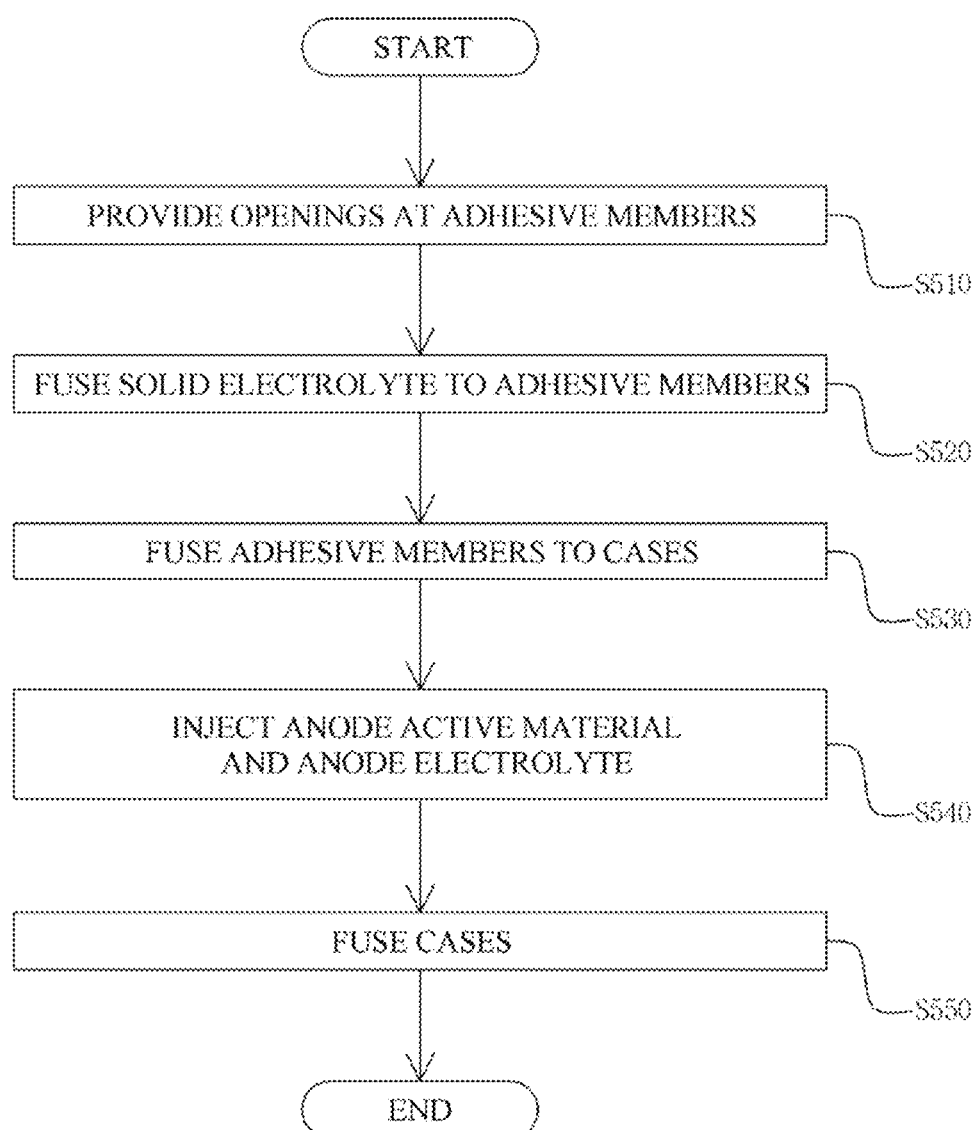
FIG. 5 is a flowchart of a manufacturing method of an anode for a secondary battery according to another embodiment of the present invention.
Figure 6A:
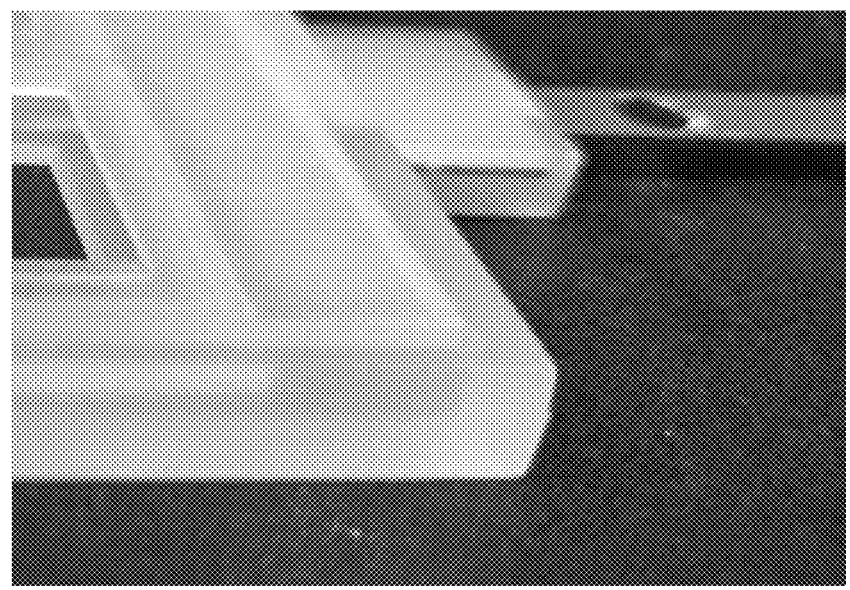
FIGS. 6A and 6B are diagrams for describing a process of thermally fusing the first case and the second case.
Figure 6B:
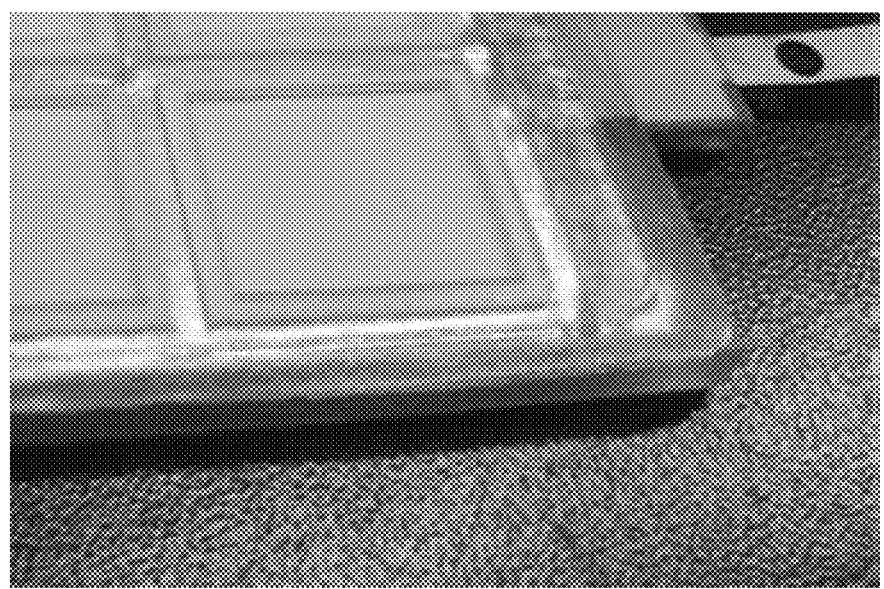

FIG. 5 is a flowchart of a manufacturing method of an anode for a secondary battery according to another embodiment of the present invention, and FIGS. 6A and 6B are diagrams for describing a process of thermally fusing the first case and the second case.

Referring to FIG. 5, the manufacturing method of an anode for a secondary battery according to the present embodiment may include forming the plurality of openings 410 and 411 by punching the first and second adhesive members 40 and 41 (S510), fusing a plurality of electrolytes 30 and 31 to the first and second adhesive members 40 and 41 (S520), fusing the first and second adhesive members 40 and 41 to the first and second cases 10 and 20 (S530), injecting an anode active material and a liquid electrolyte into the second case 20 to which the second adhesive member 41 is fused (S540), and fusing the first and second cases 10 and 20.

An apparatus for manufacturing an anode for a secondary battery may perform the manufacturing method of an anode for a secondary battery according to the present embodiment.

The apparatus for manufacturing an anode for a secondary battery may include a fusing part, an injection part, and a punching part. Here, each of the fusing part, the injection part, and the punching part means to include all machines, devices, and mechanisms capable of performing respective processes.

For example, the fusing part may be configured with of a plurality of heat fusing devices. The injection part may be provided in an argon (Ar) atmosphere.

The operation S510 is an operation of forming the plurality of openings 410 and 411 by punching the first and second adhesive members 40 and 41. The punching part punches the first and second adhesive members 40 and 41, and thus the plurality of openings 410 and 411 may be formed at the first and second adhesive members 40 and 41.

Preferably, the plurality of openings 410 and 411 may be formed at positions corresponding to the plurality of openings 11 and 21 formed at the first and second cases 10 and 20. This is because the plurality of openings 410 and 411 are formed at positions corresponding to the plurality of openings 11 and 21 formed at the first and second cases 10 and 20, so that an ion exchange between the ion-containing solution and the liquid electrolyte may be easily performed.

The operation S520 is a first fusing operation of fusing the plurality of electrolytes 30 and 31 to the first and second adhesive members 40 and 41. The fusing part may fuse the electrolytes 30 and 31 to the first and second adhesive members 40 and 41, respectively. Preferably, the fusing part may fuse the edges of the plurality of openings 410 and 411 to the edges of the electrolytes 30 and 31.

The operation S530 is a second fusing operation of fusing the first and second adhesive members 40 and 41 to the first and second cases 10 and 20. The fusing part may fuse the first adhesive member 40 and the second adhesive member 41 to the first case 10 and the second case 20, respectively.

Preferably, the electrolytes 30 and 31 fused to the first and second adhesive members 40 and 41 may be seated on the stepped levels 120 and 121, and then the first and second adhesive members 40 and 41 may be fused to the first and second cases 10 and 20. That is, the plurality of electrolytes 30 and 31 may be seated on the stepped levels 120 and 121, which are formed along the edges of the plurality of openings 11 and 21 formed at the first case 10 and the second case 20, and then the first adhesive member 40 and the second adhesive member 41 may be respectively fused to the first case 10 and the second case 20.

The operation S540 is an operation of injecting the anode active material and the liquid electrolyte into the second case 20 to which the second adhesive member 41 is fused. The injection part may inject the anode active material and the liquid electrolyte into the second case 20 to which the second adhesive member 41 is fused.

Preferably, the operation S540 may be performed in an Ar atmosphere. That is, in an Ar gas environment, the anode active material and the liquid electrolyte may be injected into the second case 20 to which the second adhesive member 41 is fused. This is to prevent a danger such as an explosion and the like which may occur as a result of reaction between the anode active material and outside air. Further, this is to prevent outside air, water vapor, and the like from flowing into the anode 1 for a secondary battery during the manufacturing process.

The operation S550 is an operation of fusing the first and second cases 10 and 20 to each other. The fusing part may fuse the first case 10 to the second case 20. The electrolytes 30 and 31, the first and second adhesive members 40 and 41, the anode active material, and the liquid electrolyte may be sealed inside the anode 1 for a secondary battery by the fused first and second cases 10 and 20.

Preferably, the operation S550 may be performed in an Ar atmosphere. That is, in an Ar gas environment, the first case 10 and the second case 20 may be fused to each other. This is to prevent a danger such as an explosion and the like which may occur as a result of reaction between the anode active material and outside air. Further, this is to prevent outside air, water vapor, and the like from flowing into the anode 1 for a secondary battery during the manufacturing process.

Meanwhile, referring is made again to FIG. 4, and referring is made to FIG. 6A. The first and second cases 10 and 20 may respectively include the protrusions 130 and 230 formed along the edges thereof. Referring to FIG. 6B, the protrusions 130 and 230 formed at the first and second cases 10 and 20 may be thermally fused in the operation S550. That is, the protrusions 130 and 230 formed at the first and second cases 10 and 20 may be heated and melted. The first and second cases 10 and 20 may be fused to each other by means of the protrusions 130 and 230 melted by heat.

The present invention has the following excellent effects.

First, an anode for a secondary battery according to one embodiment of the present invention has an effect of maximizing a reaction area because an electrolyte is exposed at both surfaces of the anode for a secondary battery.

Further, the anode for a secondary battery according to one embodiment of the present invention has an effect of implementing a secondary battery with an improved volume output density.

Furthermore, the anode for a secondary battery according to one embodiment of the present invention has an effect of improving durability by including a plurality of small electrolytes instead of a single large electrolyte.

Moreover, a manufacturing method of an anode for a secondary battery according to another embodiment of the present invention has a relatively simplified process, such that there is an effect that the anode for a secondary battery can be easily commercialized and mass-produced.

It should be noted that effects of the present invention are not limited to the above-described effects, and other effects of the present will be apparent to those skilled in the art from the foregoing description.

Although the embodiments have been described with reference to a number of illustrative embodiments thereof, it should be understood that numerous other modifications and changes can be devised by those skilled in the art without departing from the essential features of the present invention.

The embodiments disclosed herein, therefore, are not to be taken in a sense for limiting the technical concept of the present invention but for explanation thereof, and the scope of the present invention is not limited to these embodiments.

The scope of the present invention should be construed by the appended claims, along with the full range of equivalents to which such claims are entitled.

What is claimed is:

1. An anode for a second battery, comprising:
   a first adhesive member and a second adhesive member to which a plurality of electrolytes are fused;
   a first case configured to be fused to the first adhesive member; and
   a second case configured to be fused to the second adhesive member and the first case and into which an anode active material and a liquid electrolyte are injected.

2. The anode of claim 1, further comprising an anode current collector provided inside the second case and having a portion exposed to the outside of the second case to form an external connection terminal.

3. The anode of claim 1, wherein the first adhesive member and the second adhesive member have sheet shapes.

4. The anode of claim 1, wherein each of the first adhesive member and the second adhesive member includes a plurality of openings having edges fused to the plurality of electrolytes.

5. The anode of claim 1, wherein each of the first case and the second case includes a plurality of openings configured to expose portions of the plurality of electrolytes to the outside of the anode for a secondary battery.

6. The anode of claim 5, wherein the plurality of openings are disposed to face each other at the first case and the second case.

7. The anode of claim 5, wherein each of the first case and the second case includes stepped levels on which the plurality of electrolytes are seated and which are formed along edges of the plurality of openings.

* * * * *